United States Patent
Luo et al.

(10) Patent No.: US 11,512,245 B2
(45) Date of Patent: Nov. 29, 2022

(54) THERMALLY ACTIVATED DELAYED FLUORESCENT DEEP-RED LIGHT POLYMER MATERIAL AND METHOD OF FABRICATING SAME

(71) Applicant: WUHAN CHINA STAR OPTOELECTRONICS SEMICONDUCTOR DISPLAY TECHNOLOGY CO., LTD., Wuhan (CN)

(72) Inventors: Jiajia Luo, Wuhan (CN); Xianjie Li, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 983 days.

(21) Appl. No.: 16/319,781

(22) PCT Filed: Jan. 16, 2019

(86) PCT No.: PCT/CN2019/071996
§ 371 (c)(1),
(2) Date: Jan. 22, 2019

(87) PCT Pub. No.: WO2020/098150
PCT Pub. Date: May 22, 2020

(65) Prior Publication Data
US 2021/0355375 A1    Nov. 18, 2021

(30) Foreign Application Priority Data
Nov. 14, 2018 (CN) .......................... 201811356575.1

(51) Int. Cl.
*C09K 11/06* (2006.01)
*C08G 73/06* (2006.01)
*C08G 85/00* (2006.01)
*C08G 18/77* (2006.01)

(52) U.S. Cl.
CPC ............ *C09K 11/06* (2013.01); *C08G 18/773* (2013.01); *C08G 73/06* (2013.01); *C08G 73/0688* (2013.01); *C08G 85/00* (2013.01); *C09K 2211/1022* (2013.01); *C09K 2211/1025* (2013.01); *C09K 2211/1029* (2013.01); *C09K 2211/1466* (2013.01)

(58) Field of Classification Search
CPC ............ C09K 11/06; C09K 2211/1466; C09K 2211/1022; C09K 2211/1025; C09K 2211/1029; C08G 73/0688; C08G 85/00; C08G 73/06; C08G 18/773
See application file for complete search history.

(56) References Cited

U.S. PATENT DOCUMENTS 10,374,168 B2 *   8/2019   Pfister .................. C07D 471/10

FOREIGN PATENT DOCUMENTS

| CN | 106164074 A | 11/2016 |
|---|---|---|
| CN | 106589324 A | 4/2017 |

OTHER PUBLICATIONS

STIC structure search results "661421—EICSEARCH" (Year: 2022).*

* cited by examiner

*Primary Examiner* — Jane L Stanley
(74) *Attorney, Agent, or Firm* — PV IP PC; Wei Te Chung; Ude Lu (57) ABSTRACT

A thermally activated delayed fluorescent (TADF) deep-red light polymer material is provided, and includes a main chain to polymerize a TADF molecular structure, and a side chain to connect with an alkyl chain. The TADF polymer material of this structure has excellent TADF characteristics and solubility. Further, the material can be used to fabricate an electroluminescent device by a solution processing, and a good device effect can be obtained.

10 Claims, 3 Drawing Sheets

THERMALLY ACTIVATED DELAYED FLUORESCENT DEEP-RED LIGHT POLYMER MATERIAL AND METHOD OF FABRICATING SAME

FIELD OF DISCLOSURE

The present disclosure relates to a technical field of organic photoelectric materials, and particularly to a thermally activated delayed fluorescent deep-red light polymer material and a method of fabricating the same.

BACKGROUND OF DISCLOSURE

An organic light emitting diode (OLED) is a current-driven light-emitting device using an organic material as an active material. Specifically, it refers to a technique in which an organic semiconductor material and an organic light-emitting material are driven by an electric field to cause light emission by carrier injection and recombination. Different from inorganic materials, organic materials have characteristics of low synthesis cost, adjustable function, flexibility, and good film formation.

Photoelectric conversion efficiency is one of the important parameters for evaluating OLEDs. Since an advent of organic light-emitting diodes, various fluorescent-based and phosphor-based luminescent material systems have been developed to improve a luminous efficiency of the organic light-emitting diodes. The OLED of fluorescent material has high stability, but is limited by a law of quantum statistics. Under an electric activation, a ratio of single-excited excitons to triple-excited excitons is 1:3. Therefore, an internal electroluminescence quantum efficiency of the fluorescent material is limited to 25%. Phosphorescent materials can utilize single-excited excitons and triple-excited excitons simultaneously due to a spin-orbit coupling of heavy atoms, and a theoretical intra-electron luminescence quantum efficiency can reach 100%. However, phosphorescent OLED materials use precious metals. First, the cost is high, and secondly, it is not environmentally friendly.

In order to overcome shortcomings of the above two materials, Adachi of Japan Kyushu University proposed a new type of organic luminescent materials, namely thermally activated delayed fluorescence (TADF) materials. A singlet-triplet energy gap of this kind of material is very small, and triplet excitons can be converted into singlet exciton luminescence by reverse intersystem crossing (RIST), so an internal quantum efficiency of the device can reach 100%. Thermally activated delayed fluorescent materials have attracted attention of many researchers by their unique advantages. A performance of thermal evaporation devices based on small molecule TADF materials has been comparable to those based on phosphorescent heavy metal complexes, but evaporated materials make the cost of the device very high.

Polymer thermally activated delayed fluorescent materials have obvious advantages in wet processing due to good film formation. The polymer luminescent material forms a luminescent system in such a manner that a main chain is a main body and a side chain is connected to the luminescent object, and phase separation can be effectively avoided. At the same time, the polymer has good thermodynamic stability and film forming properties, and the device can be prepared by a relatively low cost solution process.

However, how to make the thermally activated delayed polymer keep a high photoluminescence quantum yield and a relatively great reverse intersystem crossing constant is still not solved. There are only a handful of TADF materials that can be used to prepare electroluminescent devices by spin coating, and the TADF polymers are even rare.

It is therefore necessary to develop a TADF polymer to overcome the deficiencies of the prior art.

SUMMARY OF DISCLOSURE

An object of the present disclosure is to provide a thermally activated delayed fluorescent deep-red light polymer material, a method of fabricating the same, and an application thereof to solve a problem of low luminous efficiency of an organic light emitting diode existing in the prior art.

To achieve the above object, the present disclosure provides a thermally activated delayed fluorescent deep-red light polymer material, which has a structural formula as follows:

In the organic electroluminescent device, the light-emitting layer has a dominant function, and a performance of a light-emitting material is a key factor determining a performance of the device. For the existing small-molecule doping devices, a host-guest system of the light-emitting layer adopt simple physical doping, where phase separation is unavoidable. A charge-transfer complex, and exciplex are easily formed, thereby affecting the performance of the device. The polymer luminescent material is a luminescent system formed by a main chain as a main body and a side chain connecting with luminescent objects, and can effectively avoid the phase separation. At the same time, the polymer has good thermodynamic stability and film forming properties, and the device can be fabricated by a solution process with a relatively low cost property.

The thermally activated delayed fluorescent deep-red light polymer material according to the present disclosure is to polymerize the TADF molecular structure using the main chain and to link an alkyl chain using a side chain. The TADF polymer material of this structure has excellent TADF characteristics and solubility. Accordingly, it is possible to fabricate an electroluminescent device by means of a solution processing and to obtain a good device effect.

Further, in different embodiments, the thermally activated delayed fluorescent deep-red light polymer material is synthesized from a monomer compound A and a monomer compound B, and wherein:

a structural formula of the monomer compound A is:

and a structural formula of the monomer compound B is:

Further, in different embodiments, the thermally activated delayed fluorescent deep-red light polymer material is synthesized from the monomer compound A and the monomer compound B through a synthesizing route as follows:

Further, in different embodiments, the monomer compound A is synthesized through a synthesizing route as follows:

Further, in different embodiments, the monomer compound B is synthesized through a synthesizing route as follows:

The present disclosure further provides a method of fabricating a thermally activated delayed fluorescent deep-red light polymer material relating to the present disclosure, comprising following steps of:
adding the monomer compound A, the monomer compound B, palladium acetate and tri-tert-butylphosphine tetrafluoroborate into a reaction flask, so as to obtain a mixture; adding NaOt-Bu and toluene into the reaction flask in a glove box, reacting at 100-120° C. for 40-60 hours, and cooling to room temperature, so as to obtain a reaction product;
precipitating the reaction product by using a mixed solvent of methanol and acetone, so as to obtain a polymer product; and
placing the polymer product in n-hexane and acetone for extraction, and then drying the polymer product to obtain the thermally activated delayed fluorescent deep red light polymer material.

Further, in different embodiments, a molar mass ratio of the monomer compound A, the monomer compound B, palladium acetate and tri-tert-butylphosphine tetrafluoroborate is: (4-6):(4-6):(1.5-2.5):(5-7).

Further, in different embodiments, the monomer compound A is synthesized by steps of:
adding 1-iodo-3-fluoro-4-bromo-benzonitrile and copper powder into a reaction flask in an argon atmosphere, introducing deoxygenated toluene into the reaction flask after pumping, then reacting at 100 to 120° C. for 20 to 30 hours, and cooling to room temperature, so as to obtain a reaction solution; and
pouring the reaction solution into an ice water, filtering the reaction solution to obtain a solid, dissolving the solid in dichloromethane followed by spinning to form a gel product, and separating and purifying the silica gel by column chromatography to obtain the monomer compound A.

Further, in different embodiments, the monomer compound B is synthesized by steps of:
adding 3,3'-dihexyl-1,1'-dihydroxydiphenylamine, potassium hydroxide and a catalyst into a reaction flask, introducing carbon tetrachloride into the reaction flask after pumping, reacting at 100 to 120° C. for 20 to 30 hours, and cooling to room temperature, so as to obtain a reaction solution; and
pouring the reaction solution into an ice water, extracting with dichloromethane, combining organic phases, followed by spinning to form a gel product, and separating and purifying the product by column chromatography to obtain the monomer compound B.

The present disclosure further provides an organic electroluminescent device, comprising a light-emitting layer, wherein the light-emitting layer comprises the thermally activated delayed fluorescent deep-red light polymer material relating to the present disclosure.

The organic electroluminescent device comprises a glass, an electrically conductive glass (ITO) substrate layer, a hole transporting and injecting layer, the light emitting layer, an electron transporting layer, and a cathode layer.

Compared with the prior art, the present disclosure has beneficial effects that a thermally activated delayed fluorescent deep-red light polymer material relating to the present disclosure has a main chain to polymerize a TADF molecular structure, and a side chain to connect with an alkyl chain. Therefore, the thermally activated delayed fluorescent deep-red light polymer material has an excellent TADF and solubility, and the electroluminescent device can be prepared by solution processing.

Further the disclosure also provides an organic electroluminescent device using the thermally activated delayed fluorescent deep-red light polymer material as the light emitting layer, which can improve a luminous efficiency of the device, and a performance of the light emitting device is relatively stable.

DETAILED DESCRIPTION OF PREFERRED EMBODIMENTS

The technical solutions in the embodiments of the present disclosure are clearly and completely described in the following with reference to the drawings in the embodiments of the present disclosure. It is obvious that the described embodiments are only a part of the embodiments of the present disclosure, and not all of the embodiments. All other embodiments obtained by one skilled in the art based on the embodiments of the present disclosure without creative efforts are within the scope of the present disclosure.

The present disclosure provides a thermally activated delayed fluorescent deep-red light polymer material, which has a structural formula as follows:

In the organic electroluminescent device, the light-emitting layer has a dominant function, and a performance of a light-emitting material is a key factor determining a performance of the device. For the existing small-molecule doping devices, a host-guest system of the light-emitting layer adopt simple physical doping, where phase separation is unavoidable. A charge-transfer complex, and exciplex are easily formed, thereby affecting the performance of the device. The polymer luminescent material is a luminescent system formed by a main chain as a main body and a side chain connecting with luminescent objects, and can effectively avoid the phase separation. At the same time, the polymer has good thermodynamic stability and film forming properties, and the device can be fabricated by a solution process with a relatively low cost property.

The thermally activated delayed fluorescent deep-red light polymer material according to the present disclosure is to polymerize the TADF molecular structure using the main chain and to link an alkyl chain using a side chain. The TADF polymer material of this structure has excellent TADF characteristics and solubility. Accordingly, it is possible to fabricate an electroluminescent device by means of a solution processing and to obtain a good device effect.

Figure 1:
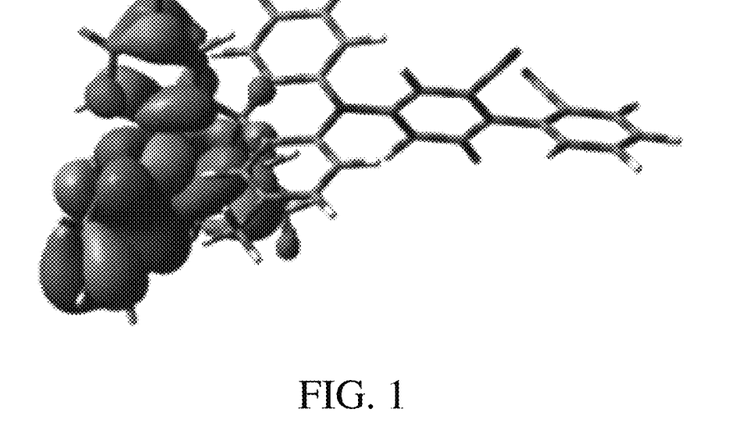
FIG. 1 is a distributing diagram showing a highest electron occupation orbital (highest occupied molecular orbital; HOMO) of a thermally activated delayed fluorescent deep-red light polymer material obtained by a theoretical calculation according to an embodiment of the present disclosure.
Figure 2:
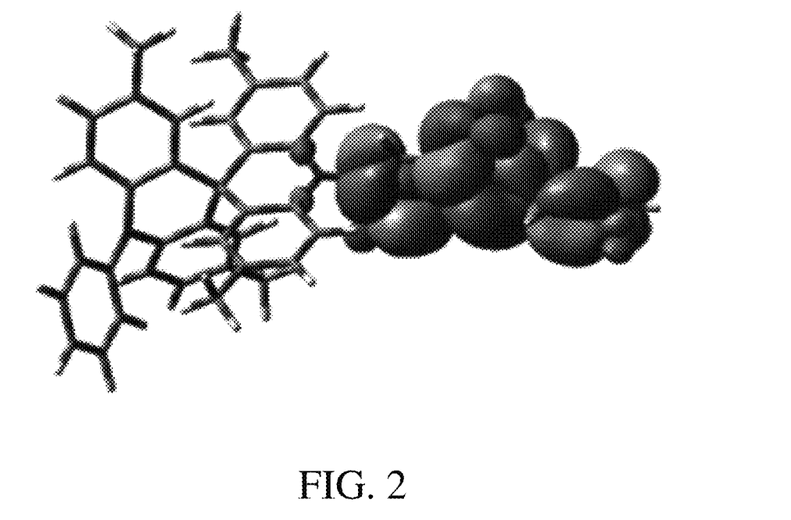
FIG. 2 is a distributing diagram showing a lowest electron occupation orbital (lowest occupied molecular orbital; LOMO) of a thermally activated delayed fluorescent deep-red light polymer material obtained by a theoretical calculation according to an embodiment of the present disclosure.

Refer to FIGS. 1 and 2, which are distributions showing a highest electron occupation orbital (highest occupied molecular orbital; HOMO) and a lowest electron occupation orbital (lowest occupied molecular orbital; LOMO) of a thermally activated delayed fluorescent deep-red light polymer material obtained by a theoretical calculation according to an embodiment of the present disclosure.

Further, a molecule of the polymer thermally activated delayed fluorescent material has a lowest singlet state (S1) and a lowest triplet energy level (T1), and an electrochemical energy level is as follows:

| | PL Peak (nm) | S1 (eV) | T1 (eV) | ☐EST (eV) | HOMO (eV) | LUMO (eV) |
|---|---|---|---|---|---|---|
| polymer | 660 | 1.88 | 1.82 | 0.06 | −5.12 | −2.54 |

Figure 3:
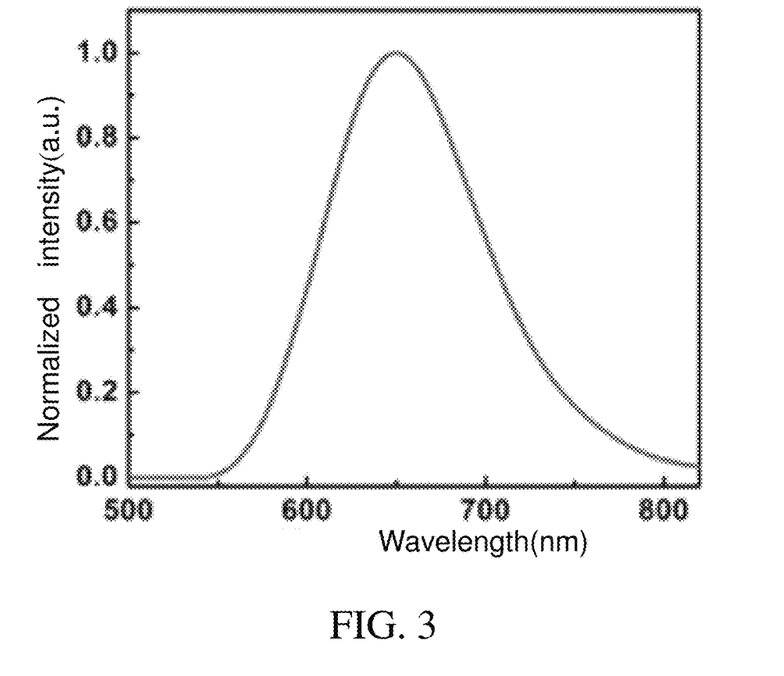
FIG. 3 is a photoluminescence spectrum of a thermally activated delayed fluorescent deep-red light polymer material according to an embodiment of the present disclosure, wherein the polymer is in a thin film at room temperature.

Refer to FIG. 3, which is a photoluminescence spectrum of a thermally activated delayed fluorescent deep-red light polymer material provided by an embodiment of the present disclosure, wherein the polymer is in a thin film at room temperature.

Figure 4:
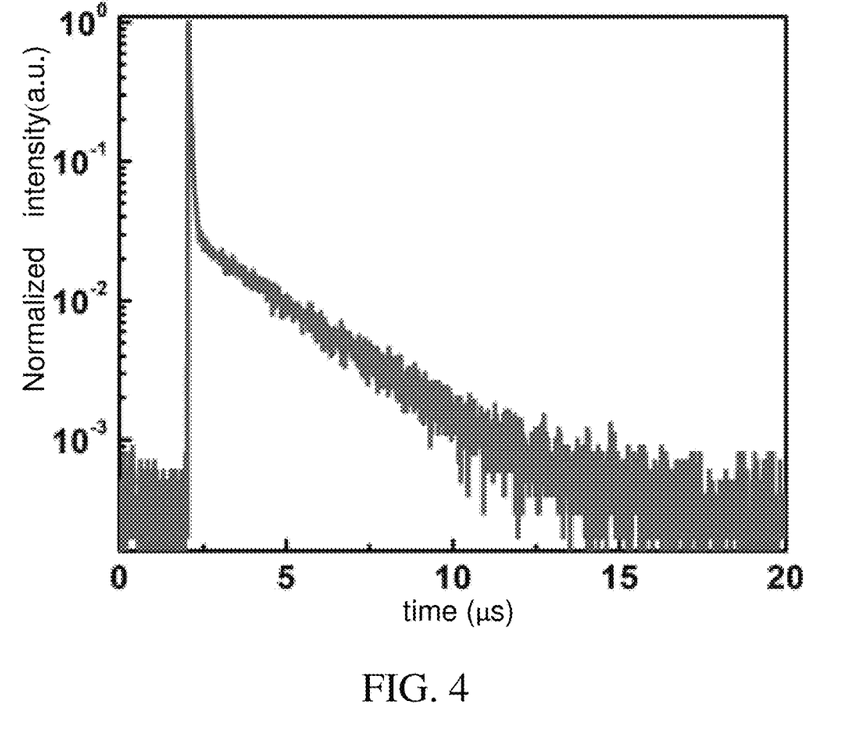
FIG. 4 is a transient photoluminescence spectrum of a thermally activated delayed fluorescent deep-red light polymer material according to an embodiment of the present disclosure, wherein the polymer is in a thin film at room temperature.

Refer to FIG. 4, which is a transient photoluminescence spectrum of a thermally activated delayed fluorescent deep-red light polymer material provided by an embodiment of the present disclosure, wherein the polymer is in a thin film at room temperature.

In one embodiment, a thermally activated delayed fluorescent deep-red light polymer material relating to the present disclosure is synthesized from a monomer compound A and a monomer compound B, and wherein:
a structural formula of the monomer compound A is:

and
a structural formula of the monomer compound B is:

The monomer compound A is synthesized through a synthesizing route as follows:

Specifically, in one embodiment, the synthesizing route can include the following steps.

1-iodo-3-fluoro-4-bromo-benzonitrile (3.25 g, 10 mmole) and copper powder (1.28 g, 20 mmole) are added into a 200 ml two-neck bottle to pump three times. Deoxygenated toluene are introduced into the 200 ml two-neck bottle in an argon atmosphere, and then reacted at 110° C. for 24 hours.

After the reaction solution is cooled to room temperature, the reaction solution is poured into 500 ml ice water, extracted with dichloromethane three times, and organic phases are combined. Then, a gel product is formed by spinning, and the gel product is separated and purified by column chromatography (Dichloromethane: n-hexane, v:v, 1:5) to obtain 1.6 g light-blue powder, which has a yield of 47%.(1H NMR (300 MHz, CD$_2$Cl$_2$δ): 7.2 (s, 2H), 7.17 (d, J=6.9 Hz, 4H), 7.09 (s, 4H), 6.93 (d, J=6.3 Hz, 4H), 2.53 (m, J=6.3 Hz, 8H), 1.69-1.53 (m, 16H), 1.43-1.29 (m, 16H), 0.88 (t, J=6.0 Hz, 12H). MS (EI) m/z: [M]+ calcd for C$_{49}$H$_{66}$N$_2$, 682.52; found, 682.50. Anal. Calcd for C$_{49}$H$_{66}$N$_2$: C 86.16, H 9.74, N 4.10; found: C 86.11, H 9.65, N 4.09).

The monomer compound B is synthesized through a synthesizing route as follows:

Specifically, in one embodiment, the synthesizing route can include the following steps.

3,3'-dihexyl-1,1'-dihydroxydiphenylamine (3.67 g, 10 mmole), KOH (1.12 g, 20 mmole), and a catalytic amount of 18-crown-6 ether are added into a 100 ml two-neck bottle to pump three times. 50 ml carbon tetrachloride is introduced into the 100 ml two-neck bottle and reacted at 110° C. for 24 hours.

After the reaction solution is cooled to room temperature, the reaction solution is poured into 500 ml ice water, extracted with dichloromethane three times, and organic phases are combined. Then, a gel product is formed by spinning, and the gel product is separated and purified by column chromatography (Dichloromethane: n-hexane, v:v, 1:5) to obtain 1.6 g light-blue powder, which has a yield of 47%.(1H NMR (300 MHz, CD$_2$Cl$_1$, δ): 7.2 (s, 2H), 7.17 (d, J=6.9 Hz, 4H), 7.09 (s, 4H), 6.93 (d, J=6.3 Hz, 4H), 2.53 (m, J=6.3 Hz, 8H), 1.69-1.53 (m, 16H), 1.43-1.29 (m, 16H), 0.88 (t, J=6.0 Hz, 12H). MS (EI) m/z: [M]+ calcd for C$_{49}$H$_{66}$N$_2$, 682.52; found, 682.50. Anal. Calcd for C$_{49}$H$_{66}$N$_2$: C 86.16, H 9.74, N 4.10; found: C 86.11, H 9.65, N 4.09).

After the monomer compound A and the monomer compound B are obtained, the thermally activated delayed fluorescent deep-red light polymer material according to the present disclosure can be synthesized by the following synthetic route.

Specifically, in one embodiment, the synthesizing route can include the following steps.

The monomer compound A (0.4 g, 1 mmole), the monomer compound B (0.68 g, 1 mmole), palladium acetate (90 mg, 0.4 mmole), and tri-tert-butylphosphine tetrafluoroborate (0.34 g, 1.2 mmole) are added into a 200 ml two-neck bottle reaction flask. Then, NaOt-Bu (1.12 g, 12 mmol) and 50 ml toluene are added into the reaction flask in a glove box and reacted at 110° C. for 24 hours.

The reaction is cooled to room temperature, so as to obtain a reaction product. The reaction product is precipitated by using a mixed solvent of 250 ml methanol and 30 ml acetone, so as to obtain a polymer product. The obtained polymer is extracted in n-hexane for three days, and then extracted in acetone for three days, and dried under vacuum to obtain a white flocculent polymer of 0.56 g, which has a yield of 52%. The polymer has a number average molecular weight of 3.5 kg/mol, a weight average molecular weight of 5.8 g/mol, and a PDI of 1.66.

Further, the thermally activated delayed fluorescent deep-red light polymer material according to the present disclosure can be used to constitute a light emitting layer in an organic electroluminescent device.

Figure 5:
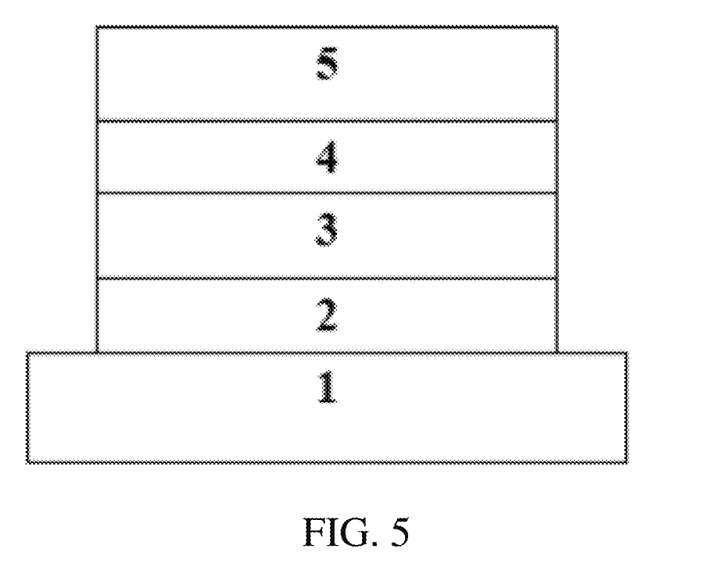
FIG. 5 is a schematic structural diagram of an organic electroluminescent device according to an embodiment of the present disclosure.

Refer to FIG. 5. An organic electroluminescent device, which uses a thermally activated delayed fluorescent deep-red light polymer material of the present disclosure as a light emitting layer, can include a glass and conductive glass (ITO) substrate layer 1, a hole transporting and injecting layer 2 (poly 3,4-ethylenedioxythiophene: polystyrene sulfonate, PEDOT:PSS), a luminescent layer 3 (the delayed fluorescent deep-red light polymer material according to the present disclosure), an electron transporting layer 4 (1,3,5-tris(3-(3-pyridyl)phenyl)benzene; Tm3PyPB), and a cathode Layer 5 (Lithium fluoride/aluminum).

An electroluminescent device can be fabricated by methods known in the art, as produced by a method disclosed in the reference (Adv. Mater. 2003, 15, 277). The specific method is that: the PESOT:PSS, the polymer light-emitting layer are spin-coated on a cleaned conductive glass (ITO) substrate, and then vapor-depositing TmPyPB, 1 nm LiF and 100 nm Al in sequence under high vacuum conditions. Using this method, a device as shown in FIG. 1 is obtained, and various specific device structures are as follows:
ITO/PEDOT:PSS (50 nm)/polymer (40 nm)/TmPyPB(40 nm)/LiF(1 nm)/Al(100 nm).

Further, a performance measurement is performed on the above electroluminescent device, wherein a current-luminance-voltage characteristic of the device is completed by a Keithley source measurement system with a corrected silicon photodiode (Keithley 2400 Sourcemeter, Keithley 2000 Currentmeter). The electroluminescence spectrum is measured by a French JY SPEX CCD3000 spectrometer, and all measurements are performed at room temperature in the atmosphere. The performance data of the device is shown in the following table:

| device | Maximum brightness (cd/m$^2$) | Starting voltage (V) | CIE | Maximum external quantum efficiency (%) |
|---|---|---|---|---|
| device | 3212 | 5.9 | (0.71, 0.33) | 12.8 |

The description above is merely preferred embodiments of the present disclosure. It is noted that, for one skilled in the art, many changes and modifications to the described embodiment can be carried out without departing from the principles of the disclosure and these changes and modifications should also be considered as the present disclosure.

The invention claimed is:

1. A thermally activated delayed fluorescent deep-red light polymer material having repeating units as follows:

2. The thermally activated delayed fluorescent deep-red light polymer material according to claim 1, wherein the thermally activated delayed fluorescent deep-red light polymer material is synthesized from a monomer compound A and a monomer compound B, and wherein:

a structural formula of the monomer compound A is:

and a structural formula of the monomer compound B is:

3. The thermally activated delayed fluorescent deep-red light polymer material according to claim 2, wherein the thermally activated delayed fluorescent deep-red light poly- mer material is synthesized from the monomer compound A and the monomer compound B through a synthesizing route as follows:

4. The thermally activated delayed fluorescent deep-red light polymer material according to claim 2, wherein the monomer compound A is synthesized through a synthesizing route as follows:

5. The thermally activated delayed fluorescent deep-red light polymer material according to claim 2, wherein the monomer compound B is synthesized through a synthesizing route as follows:

6. A method of fabricating a thermally activated delayed fluorescent deep-red light polymer material according to claim 1, comprising following steps of:
  adding a monomer compound A, a monomer compound B, palladium acetate and tri-tert-butylphosphine tetrafluoroborate into a reaction flask, so as to obtain a mixture;
  adding NaOt-Bu and toluene into the reaction flask in a glove box, reacting at 100-120° C. for 40-60 hours, and cooling to room temperature, so as to obtain a reaction product;
  precipitating the reaction product by using a mixed solvent of methanol and acetone, so as to obtain a polymer product; and
  placing the polymer product in n-hexane and acetone for extraction, and then drying the polymer product to obtain the thermally activated delayed fluorescent deep red light polymer material, wherein:

a structural formula of the monomer compound A is:

and
a structural formula of the monomer compound B is:

7. The method of fabricating the thermally activated delayed fluorescent deep-red light polymer material according to claim 6, wherein a molar mass ratio of the monomer compound A, the monomer compound B, palladium acetate and tri-tert-butylphosphine tetrafluoroborate is: (4-6):(4-6):(1.5-2.5):(5-7).

8. The method of fabricating the thermally activated delayed fluorescent deep-red light polymer material according to claim 6, wherein the monomer compound A is synthesized by steps of:

adding 1-iodo-3-fluoro-4-bromo-benzonitrile and copper powder into a reaction flask in an argon atmosphere, introducing deoxygenated toluene into the reaction flask after pumping, then reacting at 100 to 120° C. for 20 to 30 hours, and cooling to room temperature, so as to obtain a reaction solution; and pouring the reaction solution into an ice water, filtering the reaction solution to obtain a solid, dissolving the solid in dichloromethane followed by spinning to form a gel product, and separating and purifying the gel product by column chromatography to obtain the monomer compound A.

9. The method of fabricating the thermally activated delayed fluorescent deep-red light polymer material according to claim 6, wherein the monomer compound B is synthesized by steps of:

adding 3,3'-dihexyl-1,1'-dihydroxydiphenylamine, potassium hydroxide and a catalyst into a reaction flask, introducing carbon tetrachloride into the reaction flask after pumping, reacting at 100 to 120° C. for 20 to 30 hours, and cooling to room temperature, so as to obtain a reaction solution; and pouring the reaction solution into an ice water, extracting with dichloromethane, combining organic phases, followed by spinning to form a gel product, and separating and purifying the gel product by column chromatography to obtain the monomer compound B.

10. An organic electroluminescent device, comprising a light-emitting layer, wherein the light-emitting layer comprises the thermally activated delayed fluorescent deep-red light polymer material according to one of claim 1.

* * * * *